United States Patent
Tajima et al.

(10) Patent No.: US 7,077,527 B2
(45) Date of Patent: Jul. 18, 2006

(54) REAR-PROJECTION TYPE IMAGING DEVICE

(75) Inventors: Koichi Tajima, Echizen (JP); Kenji Shimoshita, Echizen (JP)

(73) Assignee: Orion Electric Co., Ltd., Echizen (JP)

( * ) Notice: Subject to any disclaimer, the term of this patent is extended or adjusted under 35 U.S.C. 154(b) by 0 days.

(21) Appl. No.: 11/253,706

(22) Filed: Oct. 20, 2005

(65) Prior Publication Data

US 2006/0092386 A1    May 4, 2006

(30) Foreign Application Priority Data

Oct. 28, 2004    (JP) .............................. 2004-313766

(51) Int. Cl.
 *G03B 21/56* (2006.01)
 *H04N 5/64* (2006.01)
(52) U.S. Cl. ...................... 353/77; 348/836; 348/787; 248/924; 312/7.2
(58) Field of Classification Search ................. 353/74, 353/77, 78, 119; 348/836, 839, 840, 843, 348/787, 789; 248/917, 918, 924, 910; 312/7.2
See application file for complete search history.

(56) References Cited

U.S. PATENT DOCUMENTS

| | | | |
|---|---|---|---|
| 5,929,945 A * | 7/1999 | Negishi et al. | 348/825 |
| 6,377,320 B1 * | 4/2002 | Ananian et al. | 348/836 |
| 6,661,473 B1 * | 12/2003 | Teshima et al. | 348/787 |
| 6,851,810 B1 * | 2/2005 | Arai et al. | 353/15 |

FOREIGN PATENT DOCUMENTS

| | | |
|---|---|---|
| JP | 2001-54039 | 2/2001 |
| JP | 3381181 | 12/2002 |
| JP | 2003-337377 | 11/2003 |

* cited by examiner

Primary Examiner—William C. Dowling
(74) Attorney, Agent, or Firm—Westerman, Hattori, Daniels & Adrian, LLP.

(57) ABSTRACT

It is an object of the present invention to share a projection unit which is a principal component of a rear-projection type imaging device and a chassis are mounted to thereby share a molding die of a base cabinet. Upper cabinets 3 are molded according to the inch size of a screen 7. A chassis 25 is shared. A base cabinet 5 is molded with a common molding die, nesting dies are built in according to the width of an upper cabinet 3 and adjustment sections 22 are formed as a single piece on both sides of the base cabinet 5. Adjustment sections 22a disposed on both sides of a back cover 6 and a decorative panel 26 fixed to the front of the base cabinet 5 are molded separately so as to match the width of the upper cabinet 3 to the width of a lower cabinet 4.

2 Claims, 7 Drawing Sheets

(a)

(b)

(a)

(b)

REAR-PROJECTION TYPE IMAGING DEVICE

The present application is based on and claims priority of Japanese patent application No. 2004-313766 filed on Oct. 28, 2004, the entire contents of which are hereby incorporated by reference.

BACKGROUND OF THE INVENTION

1. Field of the Invention

The present invention relates to a rear-projection type imaging device which reflects an optical image projected from a projection unit and projects the image onto a screen which is provided exposed on one side of a housing, and more particularly, to a rear-projection type imaging device which shares at least a projection unit and a base cabinet incorporating principal components such as various control substrates which control the projection unit so as to make the screen size selectable.

2. Description of the Related Art

Conventionally, as a rear-projection type imaging device, one described in Japanese Patent Laid-Open Publication No. 2003-337377 (patent document 1) is known. The rear-projection type imaging device disclosed here incorporates a projection unit which modulates a beam projected from a lamp unit according to image information, forms an optical image and projects an enlarged image of the optical image, a reflecting mirror which reflects the projected image and a screen which projects the optical image reflected from the reflecting mirror in a box-shaped housing, and projects the optical image reflected from the reflecting mirror onto the screen.

However, there are a plurality of inch sizes for each screen of this type of rear-projection type imaging device and when this inch size changes, the size of the housing which houses this imaging device also changes. However, providing various types of housing according to the size of the screen results in low productivity and a cost increase, and therefore Japanese Patent No. 3381181 (patent document 2) proposes a rear-projection type imaging device which forms a rear-projection type imaging device divided into two parts; an upper cabinet and lower cabinet, provides a screen and a reflecting mirror in the upper cabinet, provides principal components as a television such as an imaging apparatus, drive and control circuits, a projection unit including a projection lens and a light source in the lower cabinet, and is constructed in such a way as to make it possible to select a screen set in the upper section and the size of the upper cabinet which accommodates the screen by adjusting the focus of the projection lens. Furthermore, Japanese Patent Laid-Open Publication No. 2001-54039 (patent document 3) proposes a rear-projection type imaging device including a lower cabinet, a lower back cover surrounding the lower cabinet, a chassis section provided with a speaker device, an optical unit and a control circuit, an upper cabinet, a projection section provided with an upper back cover surrounding the upper cabinet, a screen and a reflecting mirror, capable of sharing the chassis section which fixes principal components such as various control substrates which controls the projection unit irrespective of the inch size of the screen.

The rear-projection type imaging device shown in the patent document 2 provides a plurality of types of upper cabinets provided with screens of different sizes and selectively combines them with the lower cabinet to thereby share the lower cabinet to which the principal components are fixed. Furthermore, the patent document 3 can share the chassis section provided with an optical unit and control circuit. However, according to the patent document 2, as the size of the screen increases, the width of the upper cabinet provided with this screen also increases, and therefore when the width of the lower cabinet is set according to the width of the upper cabinet mounted with a screen of a minimum size, the width of the lower cabinet differs from the width of the upper cabinet as the size of the screen increases. For this reason, the upper cabinet extends outward from both sides of the lower cabinet, not making a good appearance from the standpoint of the design. On the other hand, the patent document 3 can share the chassis section and principal components including a projection unit mounted in the chassis section, but cannot share the lower cabinet with which they are combined, and therefore it is necessary to manufacture a lower cabinet for every inch size and the degree of compatibility among parts is low, which leads to a problem of increasing the manufacturing cost as well.

SUMMARY OF THE INVENTION

The present invention is intended to solve the above described problems and it is an object of the present invention to provide a rear-projection type imaging device capable of reducing costs through sharing of parts and improving design features even when the inch size is increased by matching the width of the lower cabinet to that of the upper cabinet.

The rear-projection type imaging device according to a first aspect of the present invention is a rear-projection type imaging device including an upper cabinet and a lower cabinet divided in vertical direction and jointly forming a housing, wherein the upper cabinet is provided with at least a screen and a reflecting mirror, the lower cabinet is provided with a projection unit for modulating a beam projected from at least a lamp unit according to image information, forming an optical image and projecting an enlarged optical image and a chassis for fixing principal components such as various control substrates for controlling the projection unit, the upper cabinet provides a plurality of types of upper cabinets whose outside size varies according to the size of the screen, the lower cabinet includes a base cabinet that fixes the projection unit and the chassis on which principal components such as various control substrates are mounted, a decorative panel fixed to the front of the base cabinet and a back cover fixed to the back of the base cabinet, the widths of the back cover and base cabinet are set to be the same as that of the upper cabinet in which the screen of a minimum size is mounted, and adjustment sections which eliminate a difference in the width between the upper cabinet, the base cabinet and the back cover produced due to an increase in the width of the upper cabinet are provided at both side ends of the base cabinet and back cover.

According to the structure in the first aspect of the present invention, principal components of the rear-projection type imaging device are mounted on the chassis fixed to the base cabinet and the upper cabinet is furnished with the screen and reflecting mirror, and therefore it is possible to share the principal components of the rear-projection type imaging device, the chassis on which the principal components are mounted and the base cabinet in which the chassis is mounted irrespective of the inch size of the screen and make the screen, the upper cabinet in which the screen is fitted and the reflecting mirror applicable to an arbitrary inch size, making it possible to easily manufacture the rear-projection type imaging device of a variety of types of inch sizes.

Furthermore, since adjustment sections for eliminating the difference in the width between the base cabinet and back cover are provided at both side ends of the base cabinet and back cover, the lower cabinet and upper cabinet have the same width and it is possible to make the lower cabinet and upper cabinet continuous to each other in a design, thus providing the rear-projection type imaging device with a good appearance and excellent design.

The rear-projection type imaging device according to a second aspect of the present invention is the rear-projection type imaging device according to the first aspect of the present invention, wherein the base cabinet is molded as a single piece using resin, the molding die for molding the base cabinet is shared and the adjustment sections are molded as a single piece on both sides of the base cabinet using nesting dies incorporated in the molding die according to the width of the upper cabinet.

According to the structure in the second aspect of the present invention, it is possible to share the molding die for molding the base cabinet and match the width of the lower cabinet to the width of the upper cabinet by incorporating nesting dies into the common molding die and molding adjustment sections on both sides of the base cabinet as a single piece.

BRIEF DESCRIPTION OF THE DRAWINGS

FIG. 3A is a plan view and FIG. 3B is a front view;

FIG. 4A is a plan view and FIG. 4B is a front view;

FIG. 5A is a plan view and FIG. 5B is a front view;

DETAILED DESCRIPTION OF THE PREFERRED EMBODIMENTS

An embodiment as the best mode for implementing the present invention will be explained below. However, it goes without saying that the present invention is also easily applicable to structures other than that explained in the embodiment within a range not departing from the essence of the present invention.

Figure 1:
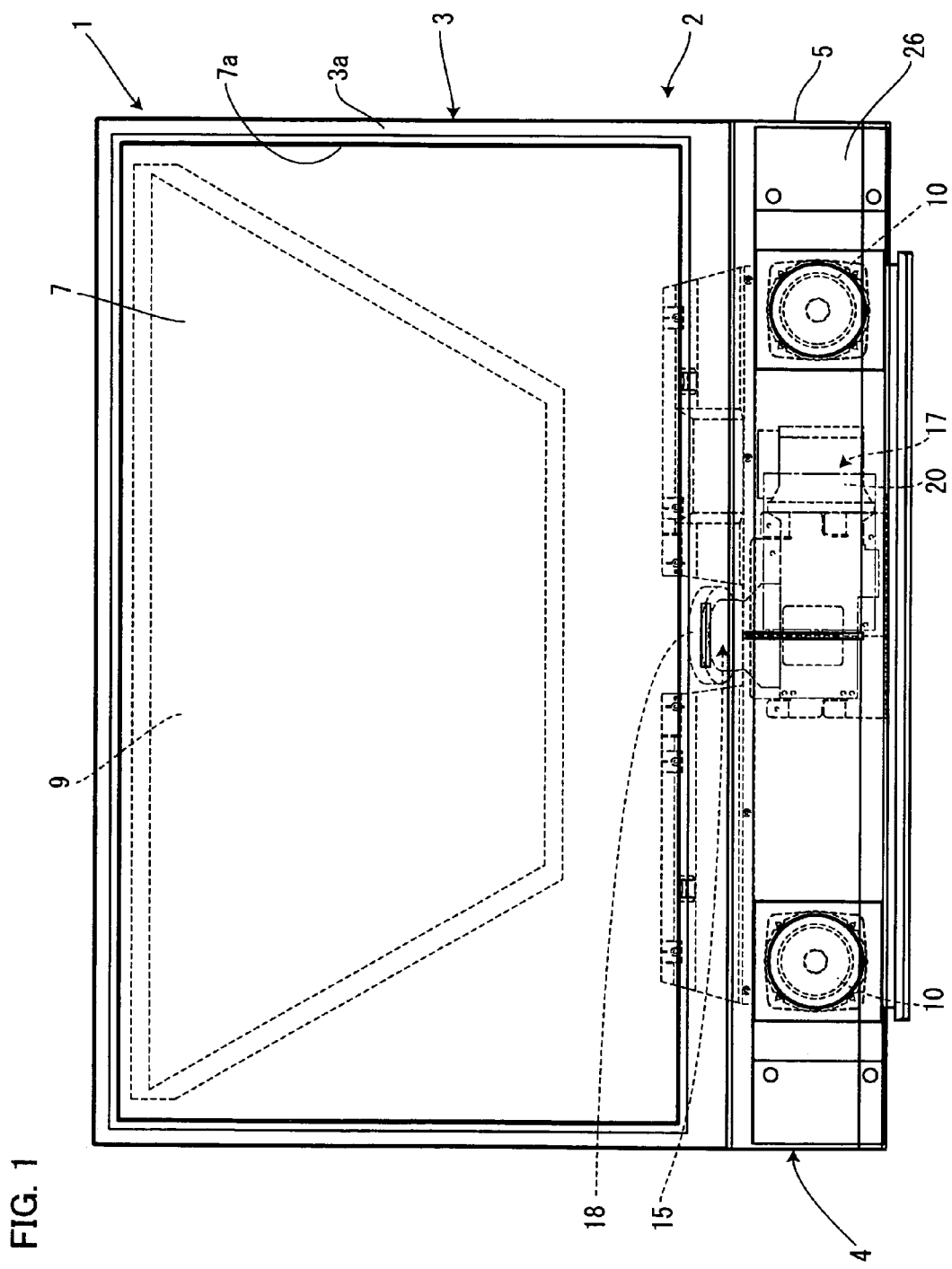
FIG. 1 is a front view showing a schematic structure of a rear-projection type imaging device according to this embodiment.
Figure 2:
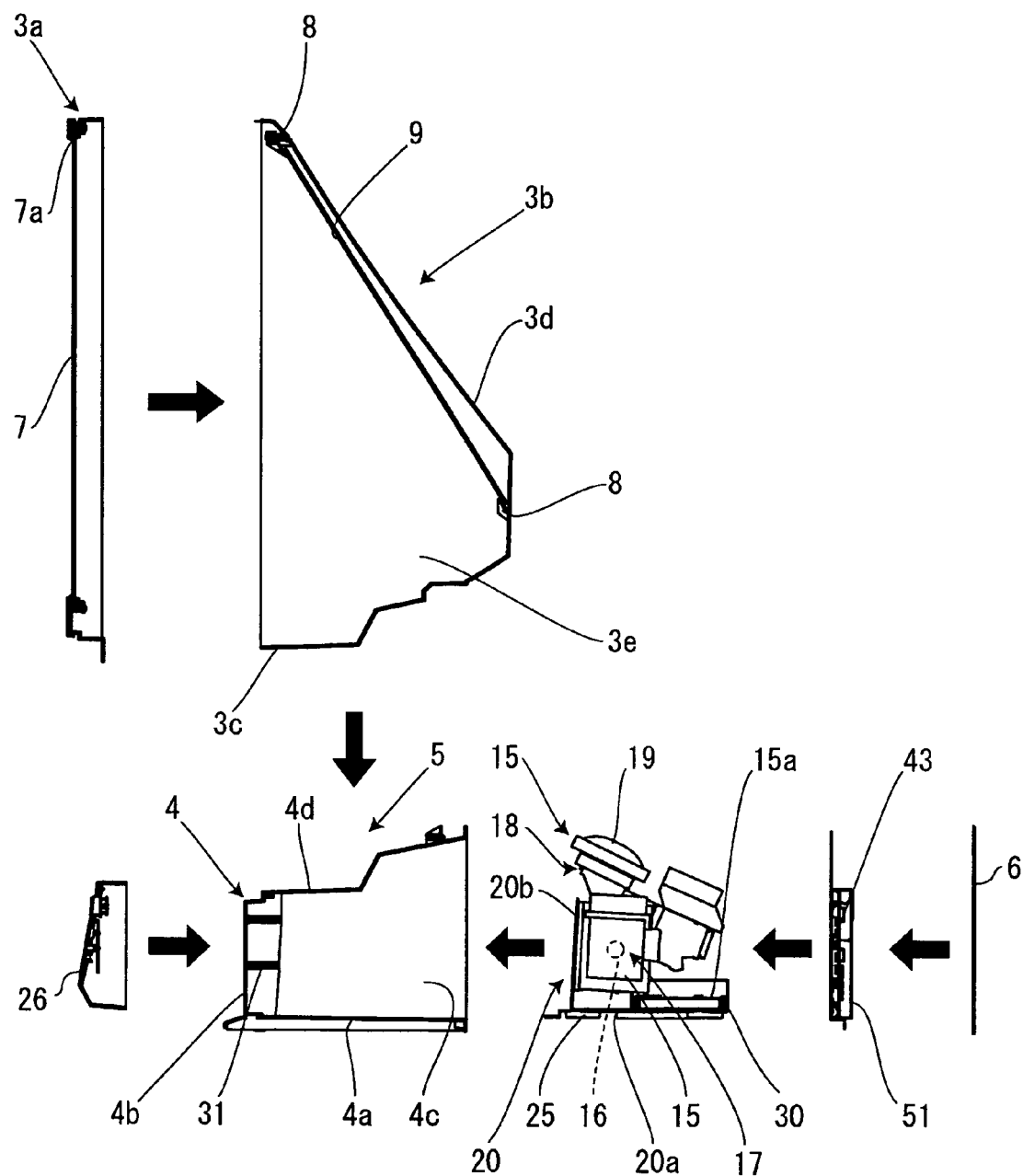
FIG. 2 is an exploded side view showing how the rear-projection type imaging device according to this embodiment is assembled.
Figure 3:
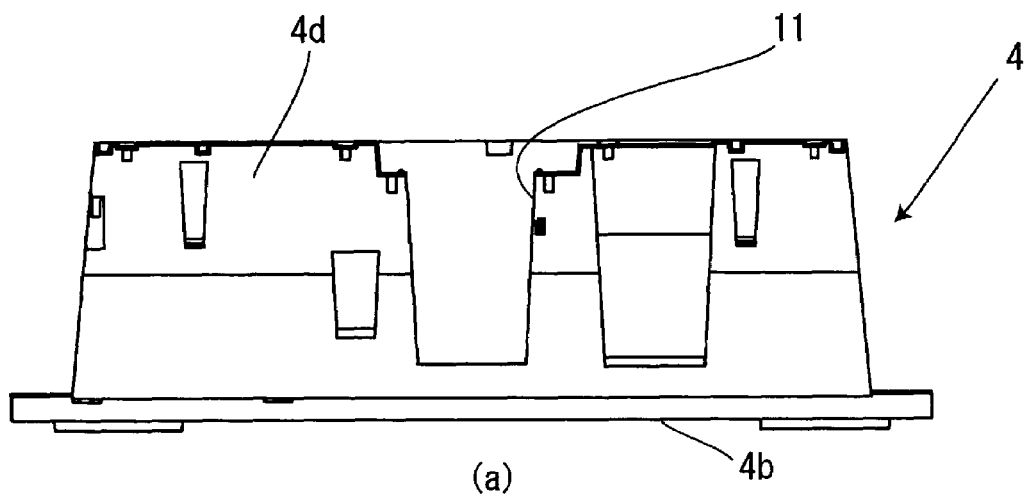
FIG. 3 shows a minimum base cabinet of the rear-projection type imaging device according to this embodiment.
Figure 3:
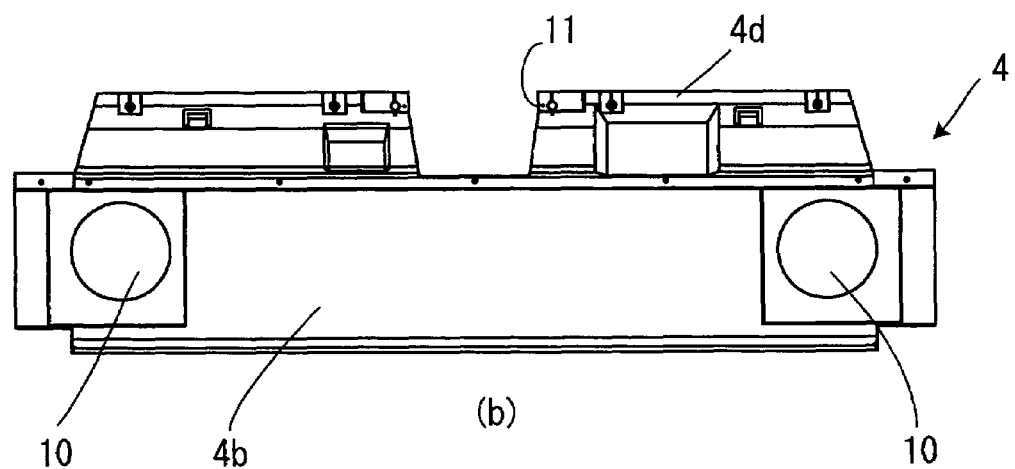
Figure 4:
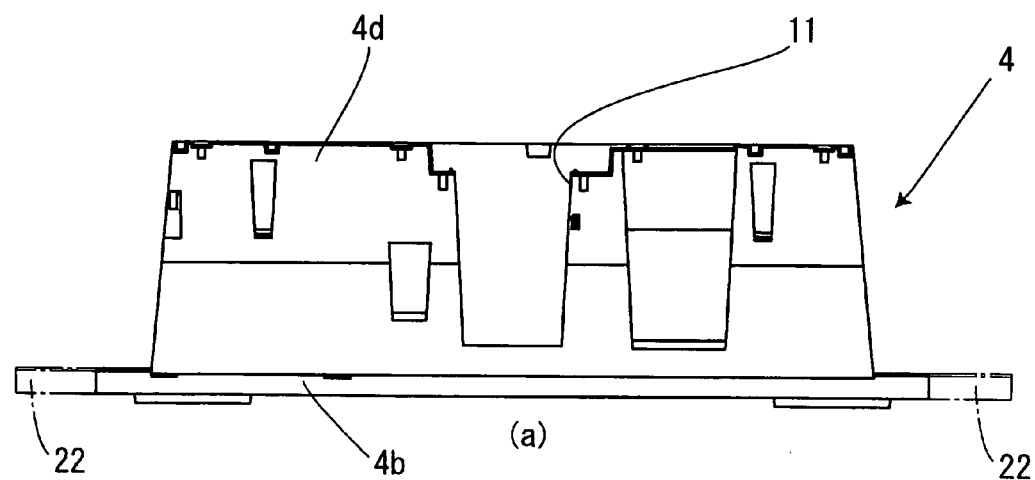
FIG. 4 illustrates how the width of the base cabinet of the rear-projection type imaging device according to this embodiment is adjusted according to the width of the upper cabinet.
Figure 4:
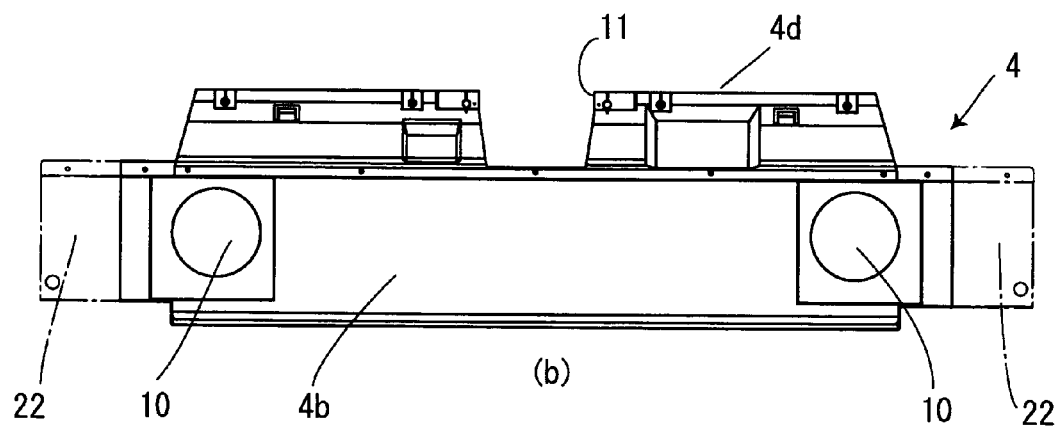
Figure 5:
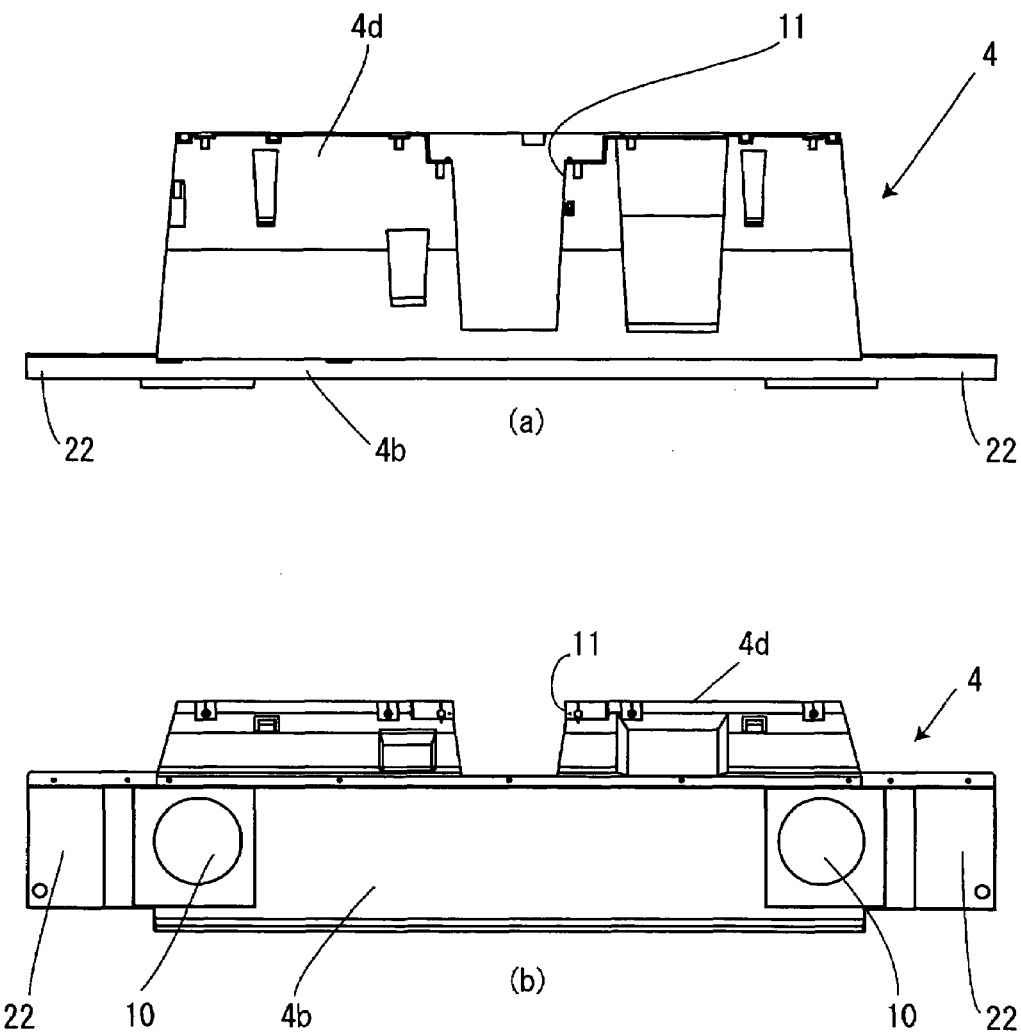
FIG. 5 illustrates an adjustment section formed on both sides of the base cabinet of the rear-projection type imaging device according to this embodiment.
Figure 6:
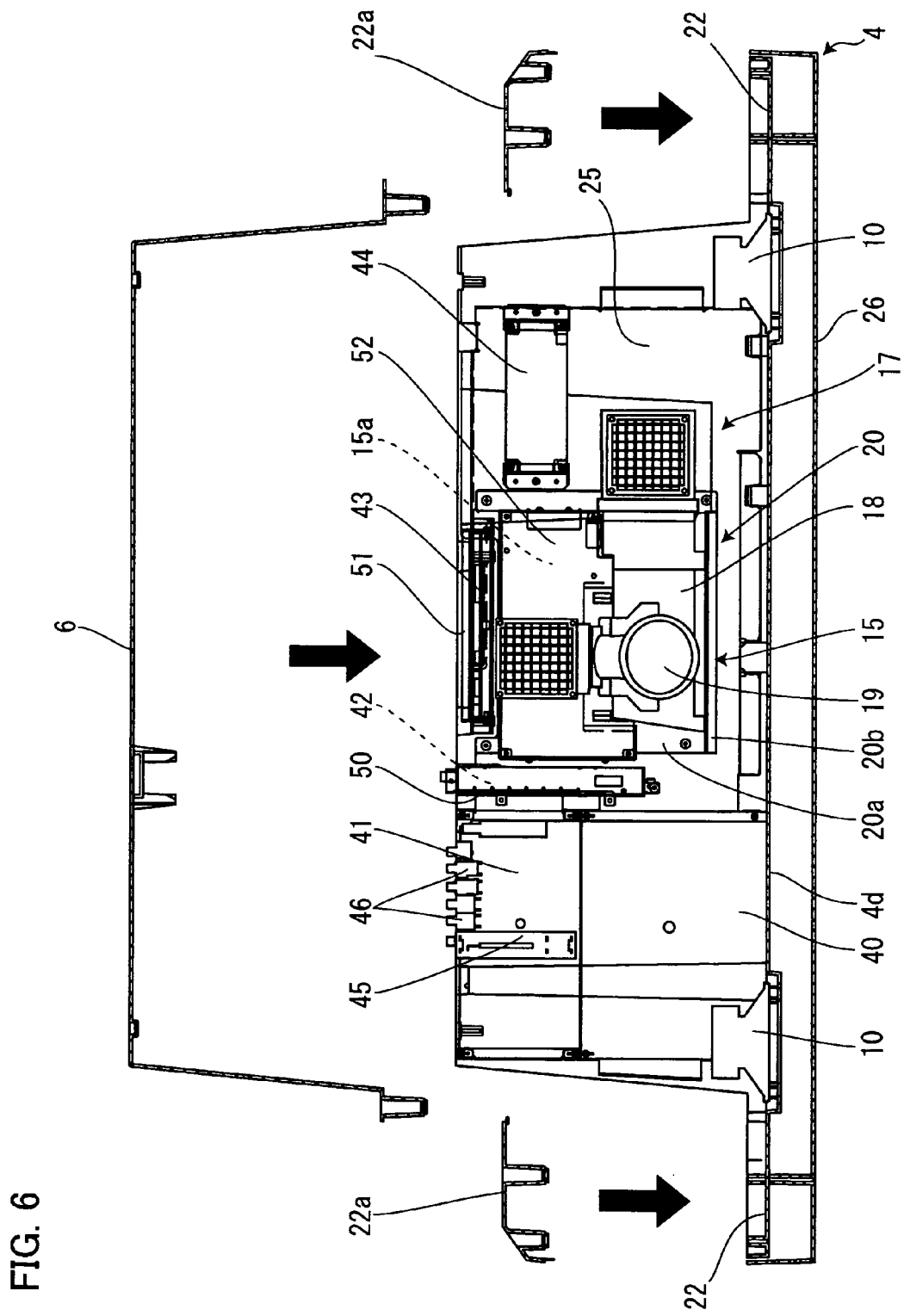
FIG. 6 is an exploded plan view of a back cover and a separate adjustment section of the rear-projection type imaging device according to this embodiment.
Figure 7:
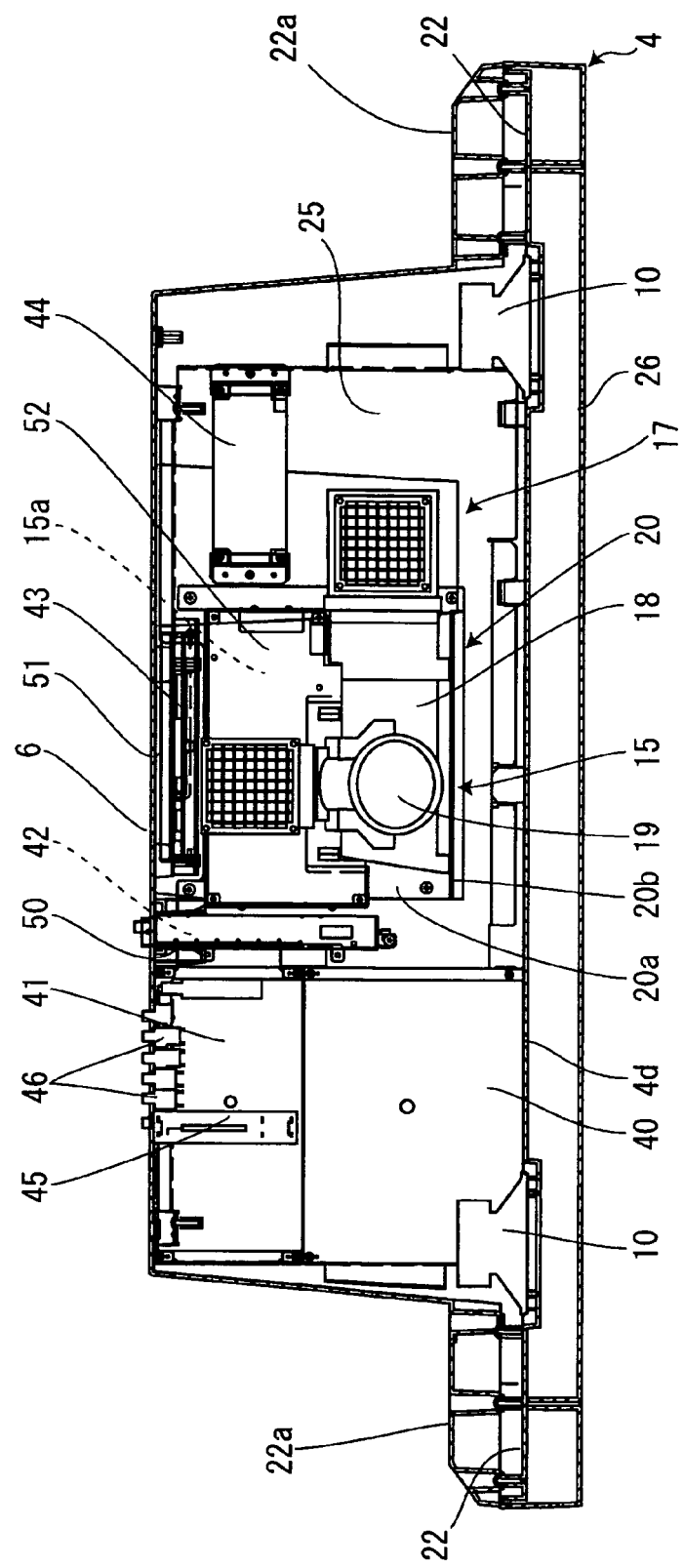
FIG. 7 is a plan view showing how the base cabinet of the rear-projection type imaging device according to this embodiment is assembled.

FIG. 1 is a front view showing a schematic structure of a rear-projection type imaging device according to the present invention, FIG. 2 is an exploded side view showing how the rear-projection type imaging device is assembled. FIG. 3 shows a minimum base cabinet, FIG. 3A is a plan view and FIG. 3B is a front view thereof, FIG. 4 illustrates how the width of the base cabinet is adjusted according to the width of the upper cabinet, FIG. 4A is a plan view and FIG. 4B is a front view thereof, FIG. 5 illustrates an adjustment section formed on both sides of the base cabinet, FIG. 5A is a plan view and FIG. 5B is a front view thereof, FIG. 6 is an exploded plan view of a back cover and a separate adjustment section and FIG. 7 is a plan view showing how the base cabinet is assembled.

With reference to the above figures, the principal structure of the rear-projection type imaging device 1 will be explained. A housing 2 of the rear-projection type imaging device 1 is constructed of an upper cabinet 3 and a lower cabinet 4 which can be separated from each other in the vertical direction, these upper cabinet 3 and lower cabinet 4 are independent of each other and assembled together with the upper cabinet 3 placed on the lower cabinet 4.

The upper cabinet 3 is constructed of a front cabinet 3a and a back cabinet 3b. The front cabinet 3a is formed like a frame having a display window 7a on the front side and fixes a screen 7 inside the display window 7a. On the other hand, the back cabinet 3b includes a bottom plate section 3c, a rear plate section 3d and right/left side plate sections 3e and is formed like a box with the front side left open, and the front cabinet 3a, into the opening of which the screen 7 is fitted, is assembled and a reflecting mirror 9 is attached to a mounting section 8 formed on the inner surface of the rear plate section 3d. Furthermore, the rear plate section 3d of the back cabinet 3b as a whole is inclined, set with a precalculated angle of inclination in consideration of the positional relationship between the screen 7 mounted on the front side and reflection of an image by a projection lens which will be described later and the mounting section 8 of the reflecting mirror 9 is formed inside the inclined rear plate section 3d.

The lower cabinet 4 is constructed of a substantially box-shaped base cabinet 5 including a bottom plate section 4a, a front plate section 4b, right/left side plate sections 4c and a top plate section 4d with the rear section left open and a back cover 6 which covers the opening of the base cabinet 5, and houses a projection unit 15 of the rear-projection type imaging device 1 inside the base cabinet 5. Furthermore, speakers 10 are built in on both sides of the front plate section 4b of the base cabinet 5 and these speakers 10 are totally covered and screened with a decorative panel 26 fixed to the front of the front plate section 4b, and this decorative panel 26 is provided with various types of operation sections so that various types of operations can be performed manually or under remote control. Furthermore, the upper cabinet 3 provided with the screen 7 and reflecting mirror 9 is mounted on the top plate section 4d of the lower cabinet 4 which houses the projection unit 15 and an opening 11 in which the projection unit 15 is inserted is formed in the top plate section 4d and bottom plate section 3c which constitute the overlapping surface between the lower cabinet 4 and upper cabinet 3.

The projection unit 15 is provided with a lamp unit 17 including a high-intensity lamp 16 such as a halogen lamp or metal halide lamp which constitutes a light source and is a unit which optically processes a beam irradiated from the lamp 16, forms an optical image corresponding to image information and projects an enlarged image of this optical image. Furthermore, a projection lens 19 is fixed to a casing 18 of the projection unit 15. Components such as a relay lens which transforms light from the lamp 16 into substantially parallel light, a polarization beam splitter which divides the light passing through the relay lens into transmitted light and reflected light and a polarization/conversion element made up of a reflective type liquid crystal panel which modulates the light reflected/transmitted by the polarization beam splitter into video image light are fixed as a single piece and unitized inside the casing 18, and the video image light modulated by the polarization/conversion element is projected onto the reflecting mirror 9 through the projection lens 19 built in the top surface of the casing 18. Furthermore, the casing 18 and lamp unit 17 are connected together as a single piece and the projection unit 15 unitized in this way and a driver circuit board 15*a* that drives/controls this projection unit 15 are united by a metal support frame 20.

Furthermore, a chassis 25 is fixed to an inner bottom section of the lower cabinet 4 and various substrates for driving and controlling the rear-projection type imaging device 1 including the projection unit 15 are fixed to this chassis 25.

When the screen 7 is assumed to be located on the front side as shown in FIG. 6 and FIG. 7, a power supply circuit board 40 and an analog signal processing substrate 41 are arranged side by side in the front-to-back direction to the left of the projection unit 15 in the figure and a digital circuit board 42 is interposed between the power supply circuit board 40, analog signal processing substrate 41 and projection unit 15. Furthermore, a scaler circuit board 43 is disposed on the back side of the projection unit 15 and a lamp drive circuit board 44 is disposed on the back side of the lower cabinet 4 to the right of the projection unit 15 which corresponds to the lamp unit 17 side in the figure.

The power supply circuit board 40 supplies power to the lamp drive circuit board 44, signal lines of various sections and a control microcomputer (not shown). An analog tuner 45 and input/output terminals 46 are mounted on the analog signal processing substrate 41 and an analog signal input from the analog tuner 45 is output from the input/output terminals 46 to an external apparatus and analog signals input from the input/output terminals 46 are output to the scaler circuit board 43. Furthermore, the analog signal processing substrate 41 is provided with an audio block for generating an audio multiplexed signal and surrounding signal, whereby an analog signal such as audio signal is processed. The digital circuit board 42 is provided with a digital tuner, a digital tuner input circuit and a D/A converter (not shown) which converts a digital signal to an analog signal and sends a digital signal to the analog signal processing substrate 41 and scaler circuit board 43. The scaler circuit board 43 converts a signal sent from the analog signal processing substrate 41 to a predetermined display format (resolution) and carries out processing for displaying the signal mainly on the screen 7. Furthermore, the scaler circuit board 43 is provided with a video decoder circuit (not shown) and has the function of decoding a compressed input signal. The lamp drive circuit board 44 is a lamp control substrate provided with a transformer which controls a voltage supplied from the power supply circuit board 40, generates a high voltage (approximately 1000 V) to turn on the lamp 16 and outputs the high voltage to the driver circuit board 15*a* and the driver circuit board 15*a* is a control substrate for the projection unit 15, which controls ON/OFF of the lamp 16 based on the voltage output from the lamp drive circuit board 44 and white balance and brightness or the like of the display screen. Furthermore, the digital circuit board 42, scaler circuit board 43 and the driver circuit board 15*a* are surrounded by metal shield cases 50, 51, 52. These shield cases 50, 51, 52 have the function of preventing leakage of electromagnetic noise. The shield cases 50, 51 of the digital circuit board 42 and scaler circuit board 43 are disposed upright along two sides intersecting each other at right angles of the driver circuit board 15*a*, that is, according to this embodiment, the shield case 50 of the digital circuit board 42 is disposed upright along the left end of the driver circuit board 15*a* and the shield case 51 of the scaler circuit board 43 is disposed upright along the back end of the driver circuit board 15*a*. Furthermore, the shield case 50 of the digital circuit board 42 disposed upright along the left end of the driver circuit board 15*a* is disposed between the power supply circuit board 40, analog signal processing substrate 41 and driver circuit board 15*a* so as to separate the power supply circuit board 40, analog signal processing substrate 41 from the driver circuit board 15*a*. The shield case 51 of the scaler circuit board 43 disposed upright along the back end of the driver circuit board 15*a* is interposed upright between the projection unit 15 and the back cover 6 of lower cabinet 4 facing an uprising section 20*b* of the support frame 20 which fixes the projection unit 15 and three sides of the driver circuit board 15*a* are surrounded by these shield cases 50, 51 and the uprising section 20*b* of the support frame 20. Thus, with the shield cases 50, 51 and uprising section 20*b* of the support frame 20 surrounding the three sides of the driver circuit board 15*a*, it is possible to inhibit the mixing of noise into the driver circuit board 15*a*.

Thus, the principal components of the rear-projection type imaging device 1 are fixed to the chassis 25 and the support frame 20 which fixes and unitizes the projection unit 15 and the driver circuit board 15*a* of this projection unit 15 is formed in a substantially L shape together with the bottom plate section 20*a* and uprising section 20*b* standing from one side of this bottom plate section 20*a* and the casing 18 of the projection unit 15 united with the lamp unit 17 is screwed into the uprising section 20*b*. Furthermore, a mounting piece 30 for fixing the driver circuit board 15*a* is formed by shaving in the bottom plate 20*a* and the driver circuit board 15*a* which is placed substantially horizontal to this mounting piece 30 is fixed using a screw. In this way, the support frame 20 to which the projection unit 15 and driver circuit board 15*a* are fixed is fixed to a boss section 31 formed at the bottom of the chassis 25 and the front plate 4*b* of the lower cabinet 4 as an single piece using the screw. Furthermore, the projection unit 15 fixed to the support frame 20 is fixed to an upper part of the uprising section 20*b* so as to float from the bottom plate 20*a* within a range not interfering with the optical path of an optical image reflected from the reflecting mirror 9 and fixes the driver circuit board 15*a* between the projection unit 15 and the bottom plate section 20*a*.

As described above, the projection unit 15 is fixed to the uprising section 20*b* of the support frame 20, the angle of incidence upon the reflecting mirror 9 is determined by the angle of the uprising section 20*b* and it is possible to arbitrarily select the screen size of the upper cabinet 3 by changing the angle of the uprising section 20*b* and the angle of the reflecting mirror 9 mounted on the upper cabinet 3.

That is, the chassis 25 to which the various types of substrates 40 to 44 for driving and controlling the rear-projection type imaging device 1 including the projection unit 15 are fixed is shared thereby and the upper cabinet 3 incorporating the screen 7 of a different size in the base cabinet 5 is selectively assembled. For example, by only selectively incorporating a 42-inch, 52-inch or 62-inch screen 7 in the upper cabinet 3 and incorporating the upper cabinet 3 on the base cabinet 5, this embodiment shares the chassis 25 to which the various types of substrates 40 to 44 for driving and controlling the rear-projection type imaging device 1 including the projection unit 15. In this case, as the size of the screen 7 incorporated in this upper cabinet 3 increases, the size of the upper cabinet 3 also increases. As the breadth of the upper cabinet 3 increases, adjustment sections 22 are formed on both sides of the base cabinet 5 to adjust the widths of the upper cabinet 3 and the base cabinet 5 assembled together in the vertical direction. These adjustment sections 22 are molded using a nesting die (not shown) which is mounted in a molding die of the base cabinet 5 in a freely detachable manner to thereby share the molding die of the base cabinet 5 serving as a basis. That is, using the molding die of the base cabinet 5 for mounting the upper cabinet 3 incorporating the 62-inch screen 7 which is the largest size as the reference, when the size of the screen reduces from 62-inch to 52-inch, 42-inch, the nesting dies for adjusting sizes of 52 inches, 42 inches are incorporated in the molding die and the lengths of the adjustment sections 22 formed on both sides of the front plate section 4b of the base cabinet 5 are adjusted by these nesting dies as indicated by single-dot dashed lines in FIG. 4 and at the same time separate adjustment sections 22a are formed on both sides of the back cover 6 fixed to the back of the base cabinet 5 according to the width of the upper cabinet 3 for the 52-inch or 62-inch screen and screwed to the base cabinet 5. Furthermore, the dedicated decorative panel 26 is also formed and attached to the front of the base cabinet 5 according to the width of the upper cabinet 3.

The angle of incidence of the projection unit 15 upon the reflecting mirror 9 and the angle of the reflecting mirror 9 attached to the upper cabinet 3 are set according to the inch size of the screen 7. That is, the back cabinets 3b of various sizes having the mounting section 8 corresponding to the angle of mounting of the reflecting mirror 9 are provided according to the size of the screen 7 and at the same time various support frames 20 with the angle of the uprising section 20b preset so as to match the sizes of the respective screens 7 are provided, the reflecting mirror 9 is fixed to the mounting section 8 of the back cabinet 3b and the projection unit 15 is fixed to the uprising section 20b of the support frame 20 according to the inch size of the screen 7.

Thus, by sharing the chassis 25 to which the various substrates 40 to 44 for driving and controlling the rear-projection type imaging device 1 including the projection unit 15 are fixed, it is possible to reduce the manufacturing cost of the rear-projection type imaging device 1, facilitate management of parts and easily produce rear-projection type imaging devices 1 of different inch sizes. Furthermore, by changing the nesting die to be incorporated in the molding die for molding the base cabinet 5 as the width of the upper cabinet 3 increases, it is possible to share the molding die of the base cabinet 5 and further reduce the manufacturing cost of the rear-projection type imaging device 1. Moreover, a difference is produced between the width of the lower cabinet 4 on which the upper cabinet 3 is mounted and the width of the upper cabinet 3 as the width of the upper cabinet 3 increases. However, by changing the nesting die to be incorporated into the molding die for molding the base cabinet 5, the lengths of the adjustment sections 22 to be formed on both sides of the base cabinet 5 are adjusted, the separate adjustment sections 22a are attached to both sides of the back cover 6 according to the width of the upper cabinet 3 and further the decorative panel 26 is formed separately according to the width of the upper cabinet 3, and it is thereby possible to match the width of the upper cabinet 3 to the width of the lower cabinet 4. By so doing, even when the width of the upper cabinet 3 changes, it is possible to make the upper cabinet 3 and lower cabinet 4 continuous to each other in a unified design, thus making it possible to manufacture the rear-projection type imaging device 1 with a good appearance and excellent design.

As shown above, the chassis 25 to which the various substrates 40 to 44 for driving and controlling the rear-projection type imaging device 1 including the projection unit 15 are fixed and the molding die for molding the base cabinet 5 are shared and the upper cabinet 3 incorporating the screen 7 available in various sizes is selectively assembled. For example, any one of 42 inches, 52 inches or 62 inches is applicable as the size of the screen 7 and by only changing the upper cabinet 3, this embodiment makes it possible to share the principal components of the rear-projection type imaging device 1 and the chassis 25 to which the various substrates 40 to 44 for driving and controlling the rear-projection type imaging device 1 including the projection unit 15 and at the same time share the molding die for molding the base cabinet 5, and can thereby reduce the manufacturing cost of the rear-projection type imaging device 1, facilitate management of parts and easily manufacture the rear-projection type imaging devices 1 of different inch sizes. Furthermore, by selecting a nesting die to be incorporated in the molding die, adjusting the width of the base cabinet 5 using the adjustment sections 22 on both sides of the base cabinet 5, forming the adjustment sections 22a and decorative panel 26 on both sides of the back cover 6 according to the width of the upper cabinet 3 separately, it is possible to match the width of the upper cabinet 3 to the width of the lower cabinet 4 and manufacture the rear-projection type imaging device 1 with a good appearance and excellent design.

An embodiment of the present invention has been described in detail so far, but the present invention is not limited to this embodiment and can be implemented modified in various ways within a range not departing from the essence of the present invention. For example, the shapes and mounting structures of the cabinet and the respective components are not limited to the foregoing embodiment, but can be selected as appropriate. Furthermore, the foregoing embodiment has shown an example where the adjustment sections 22 are formed as a single piece on both sides of the base cabinet 5 using nesting dies, but it is also possible to form the adjustment sections 22 separately and fix them on both sides of the base cabinet 5.

According to the rear-projection type imaging device in the first aspect of the present invention, the rear-projection type imaging device includes an upper cabinet and a lower cabinet divided in vertical direction and jointly forming a housing, wherein the upper cabinet is provided with at least a screen and a reflecting mirror, the lower cabinet is provided with a projection unit for modulating a beam projected from at least a lamp unit according to image information, forming an optical image and projecting an enlarged optical image and a chassis for fixing principal components such as various control substrates for controlling the projection unit, the upper cabinet provides a plurality of types of upper cabinets whose outside size varies according to the size of the screen, the lower cabinet includes a base cabinet that fixes the projection unit and the chassis on which principal components such as various control substrates are mounted, a decorative panel fixed to the front of the base cabinet and a back cover fixed to the back of the base cabinet, the widths of the back cover and base cabinet are set to be the same as that of the upper cabinet in which the screen of a minimum size is mounted, and adjustment sections which eliminate a difference in the width between the upper cabinet, the base cabinet and the back cover produced due to an increase in the width of the upper cabinet are provided at both side ends of the base cabinet and back cover, and therefore it is possible to share the chassis which fixes the principal components such as various control substrates for controlling the projection unit irrespective of the inch size of the screen to reduce the manufacturing cost by sharing the components and match the widths of the upper cabinet and the lower cabinet having different sizes using the adjustment sections and thereby make the lower cabinet and upper cabinet continuous to each other, thus manufacturing the rear-projection type imaging device with a good appearance.

According to the rear-projection type imaging device in the second aspect of the present invention, in the rear-projection type imaging device according to the first aspect of the present invention, the base cabinet is molded as a single piece using resin, the molding die for molding the base cabinet is shared and the adjustment sections are molded as a single piece on both sides of the base cabinet using nesting dies incorporated in the molding die according to the width of the upper cabinet, and therefore it is possible to share the molding die for molding the base cabinet to thereby further reduce the manufacturing cost and match the widths of the upper cabinet and the lower cabinet of different sizes through adjustment sections molded on both sides of the base cabinet as a single piece using nesting dies, thereby make the upper cabinet and lower cabinet continuous to each other and manufacture the rear-projection type imaging device with a good appearance.

What is claimed is:

1. A rear-projection type imaging device comprising an upper cabinet and a lower cabinet divided in vertical direction and jointly forming a housing,
   wherein the upper cabinet is provided with at least a screen and a reflecting mirror,
   the lower cabinet is provided with a projection unit for modulating a beam projected from at least a lamp unit according to image information, forming an optical image and projecting an enlarged optical image and a chassis for fixing principal components including various control substrates for controlling the projection unit,
   the upper cabinet provides a plurality of types of upper cabinets whose outside size varies according to the size of the screen,
   the lower cabinet comprises a base cabinet that fixes the projection unit and the chassis on which principal components including various control substrates are mounted, a decorative panel fixed to the front of the base cabinet and a back cover fixed to the back of the base cabinet,
   the widths of the back cover and base cabinet are set to be the same as that of the upper cabinet in which the screen of a minimum size is mounted, and
   adjustment sections which eliminate a difference in the width between the upper cabinet, the base cabinet and the back cover produced due to an increase in the width of the upper cabinet are provided at both side ends of the base cabinet and back cover.

2. The rear-projection type imaging device according to claim 1, wherein the base cabinet is molded as a single piece using resin,
   a molding die for molding the base cabinet is shared, and
   the adjustment sections are molded as a single piece on both sides of the base cabinet using nesting dies incorporated in the molding die according to the width of the upper cabinet.

* * * * *